Oct. 12, 1971 J. T. KUTNEY 3,611,724
CHOKED INLET NOISE SUPPRESSION DEVICE FOR A TURBOFAN ENGINE
Filed Jan. 7, 1970 2 Sheets-Sheet 1

INVENTOR.
JOHN T. KUTNEY
BY
AGENT—

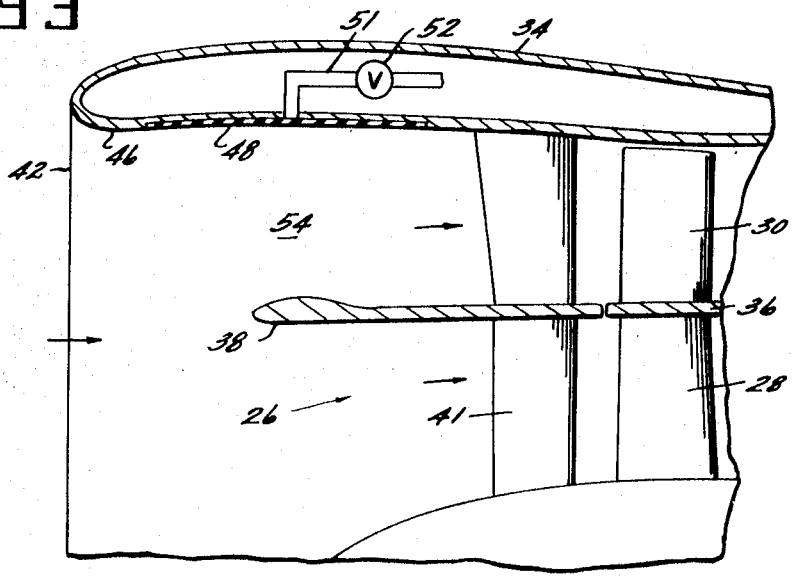
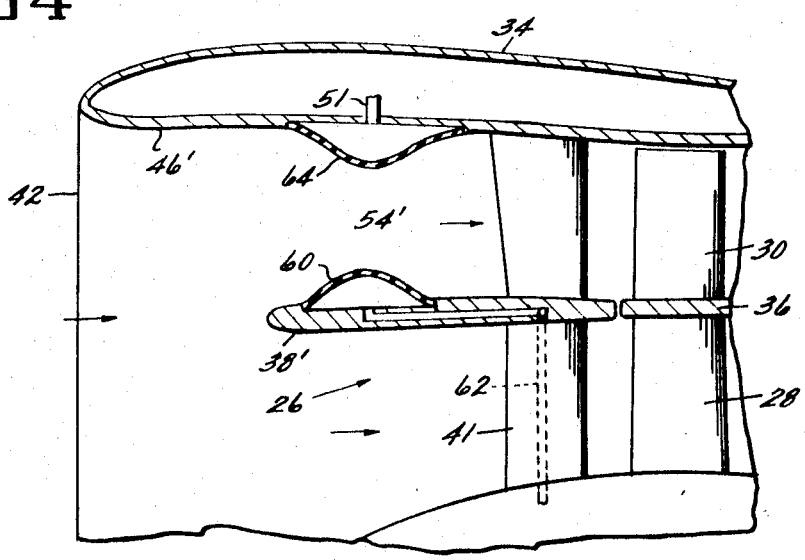

United States Patent Office 3,611,724
Patented Oct. 12, 1971

3,611,724
CHOKED INLET NOISE SUPPRESSION DEVICE FOR A TURBOFAN ENGINE
John T. Kutney, Cincinnati, Ohio, assignor to General Electric Company
Filed Jan. 7, 1970, Ser. No. 1,223
Int. Cl. F02k 3/04; F02c 7/04
U.S. Cl. 60—226 R                    11 Claims

ABSTRACT OF THE DISCLOSURE

Sound suppression means for a gas turbine power plant which includes a fan positioned within a bypass duct surrounding a core engine for driving said fan. An inflatable diaphragm is positioned within an inlet opening of the casing which surrounds the fan such that choked flow can be obtained near the inlet end of said casing upon inflation of the inflatable diaphragm. The inflatable diaphragm cooperates with axially extending platform members of a plurality of stator vanes located in front of the fan rotor to form a converging-diverging passageway upon inflation of the expansible diaphragm. Choked flow in the inlet substantially eliminates propagation of noise emanating from the fan rotor.

BACKGROUND OF THE INVENTION

This invention relates generally to gas turbine engine noise suppression and, more particularly, to noise suppression devices for turbofan engines.

In recent years the noise level generated by gas turbine powered aircraft has presented a number of problems to both those people situated close enough to airports to be affected thereby and also to gas turbine engine manufacturers who are faced with the problem of trying to eliminate the noise. The use of gas turbine power aircraft has become so commonplace that the federal government, through the Federal Aviation Agency, has begun to generate noise level standards which must be met by aircraft and gas turbine engine manufacturers before an aircraft powered by the gas turbine engine will be certified.

With the advent of new high bypass large diameter fan engines the overall noise levels generated have become even more acute due to the additional noise generated by the rotation of the fan. Such an engine, however, is needed to power the new family of wide body, large jet transport aircraft. A great amount of effort has therefore been expended in an attempt to reduce the noise levels associated with such high bypass, large diameter type fan engines. In spite of this vast amount of effort, noise levels still remain a problem.

In the air intake duct of a normal gas turbine engine, objectionable sounds travel in the direction opposite to the airflow and out of the duct. These sounds originate within the engine and are transmitted through the incoming air. If the velocity of the incoming air in the duct is increased to equal or exceed the velocity of sound at all incoming air conditions across a plane perpendicular to the inlet duct centerline at any one place along the length of the duct, this condition (known as choked flow) would operate as a sound barrier through which undesirable sound waves could not pass. Such a phenomenon has been shown to be quite effective with regular gas turbine engines. Sound barriers of this type are not frequency sensitive and will effectively halt undesirable sounds over an extremely wide range of frequencies.

In order to provide the choked flow condition, a number of different structures have been proposed. For example, a conical, tapered plug has been positioned within the inlet duct. The plug is positioned with respect to a nozzle formed within the inlet duct such that choked flow conditions can be maintained over a large degree of flight conditions. If desirable, the tapered plug can be made capable of axial movement to further widen the range of operating conditions over which choked flow can be maintained. Such a system, however, results in extremely high losses within the inlet duct and also requires heavy support members and auxiliary equipment for providing the axial movement to the plug.

SUMMARY OF THE INVENTION

It is an object of this invention, therefore, to provide a practical, choked flow silencer for a high bypass, large diameter turbofan engine.

It is a further object of this invention to provide such a silencer which is extremely lightweight, simple, and reliable, and requires few additional components.

Briefly stated, the objects of this invention are carried out by providing the turbofan engine with a variable geometry inlet which includes a flexible wall portion which has a pressure chamber therebehind to vary the position of the wall. A suitable servo fluid can be fed to the pressure chamber from a control mechanism to accurately control the profile of the flexible wall. The velocity of the incoming air increases, as the area decreases, until it reaches the velocity of sound, at which time a choked flow condition will exist which will prevent the propagation of undesirable sound out the front of the fan duct. The inflatable wall member cooperates with a fixed wall portion, which may be located on a fan duct splitter, to provide the nozzle needed to obtain the desired velocities.

DESCRIPTION OF THE DRAWINGS

While the specification concludes with claims particularly pointing out and distinctly claiming the subject matter of my invention which is sought to be protected, an understanding of my invention may be gained from the following detailed description of a preferred embodiment in connection with the accompanying drawings, in which:

FIG. 3 is an enlarged, sectional view similar to FIG. 2; and

FIG. 4 is an enlarged, sectional view of an inlet of a turbofan engine incorporating an alternative embodiment of this invention.

DETAILED DESCRIPTION OF A PREFERRED EMBODIMENT

Figure 1:
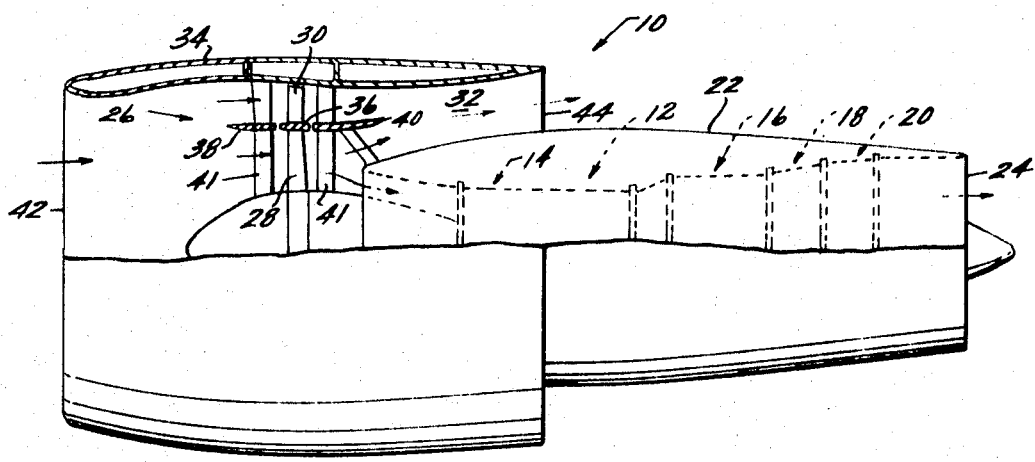
FIG. 1 is a partially schematic view of a high bypass, large diameter turbofan engine.

Referring now to the figures wherein like numerals correspond to like elements throughout, FIG. 1 shows in simplified fashion a gas turbine engine 10 of the high bypass type comprising a core engine 12 which is essentially a turboshaft engine in that it includes a compressor 14, a combustor 16, a gas generator turbine 18 for driving the compressor 14, and a power turbine 20 arranged in axially spaced serial flow relationship. The inner turbomachine, or core engine 12, is enclosed within a cylindrical casing 22 which terminates at its downstream end in an exhaust nozzle 24 through which the combustion products may be discharged to produce thrust. In order to provide additional thrust, a fan 26 is mounted upstream of the core engine 12 and is driven by the power turbine 20. The fan 26 includes inner and outer compressor blades 28 and 30, respectively, which extend radially outwardly of the casing 22 across a bypass duct or passageway 32 defined between an outer cylindrical casing 34 and the core engine casing 22, the blades 28 and 30 being interconnected by platforms 36.

The platforms 36 are aligned with stationary shroud members 38 and 40 carried by a plurality of stator vanes 41 extending radially inwardly from the casing 34. It will thus be noted that air drawn through an inlet opening 42 at the upstream end of the casing 34 is accelerated by the fan 26 after which a portion of the air passing through the inner blades 28 is supplied to the core engine 12 to support combustion therein. The remainder of the air flows through the bypass passageway 32 from which it is normally discharged in the axial downstream direction through an outlet opening 44.

The gas turbine engine 10 is a high bypass ratio machine; by the term "high bypass ratio" it is meant that the ratio of mass flow of fluid in the bypass passageway 32 to mass flow in the core engine 12 is high. Since a substantial amount of energy is extracted from the combustion gases in driving the power turbine 20 (except for losses, this energy is transferred to the bypass stream as the air is accelerated by the fan 26), it will occur to those skilled in the art that the major portion of the total thrust provided by the gas turbine engine 10 is yielded by the bypass stream of air emanating from the outlet 44.

One characteristic of every high bypass ratio engine is that the diameter of the bypass fan is much larger than the diameter normally associated with a compressor or turbine section of the core engine. Because of this large diameter the rotation of the fan 26 may result in unacceptable noise levels unless some provision is made for reducing the intensity of noise generated by such a fan. The present invention relates to such a device for reducing the noise levels associated with rotation of the large diameter fan of a high bypass ratio gas turbine engine.

Figure 2:
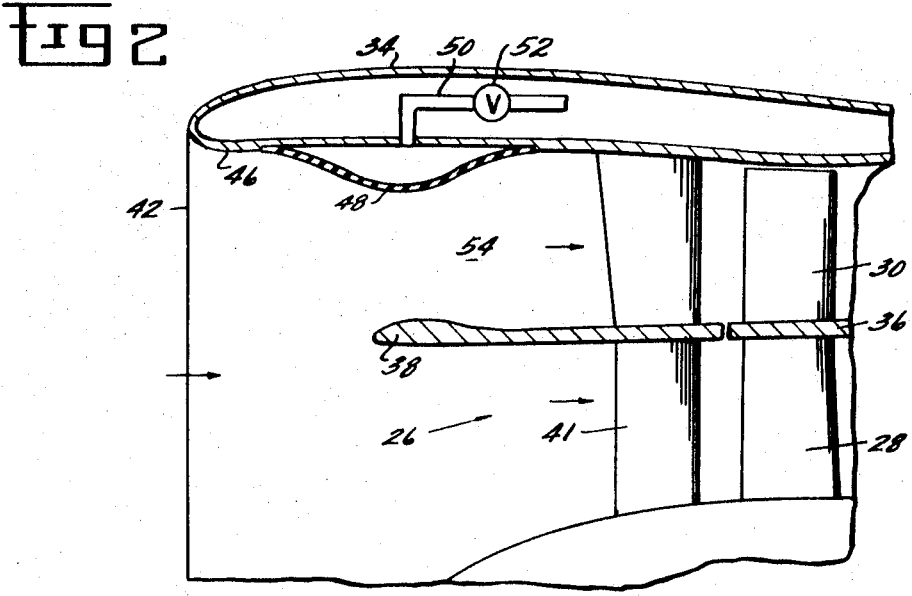
FIG. 2 is an enlarged, sectional view of a portion of the inlet of the turbofan engine shown in FIG. 1.

Referring now to FIG. 2, the details of applicant's noise reduction device are shown on an enlarged sectional view of the inlet of the gas turbine engine 10. As shown therein, the outer casing 34 is provided on its inner wall 46 with an elastic diaphragm 48, which preferably surrounds the entire casing 34. The elastic diaphragm 48 extends peripherally about the inner wall 46 of the casing 34 and is secured thereto at its upstream and downstream end in a fluidically sealed type manner. A conduit 50 is provided within the casing 34 for supplying pressurized fluid from a source (not shown) to the underside of the diaphragm 48. The conduit 50 is provided with suitable control means such as a valve 52 for regulating the flow of pressurized fluid to the elastic diaphragm 48. When the diaphragm 48 is inflated as shown in FIG. 2, it extends into a passageway 54 formed between a platform 38 and the inner wall 46 of the casing 34. In its deflated position, as illustrated in FIG. 3, the diaphragm 48 is contiguous with the wall 46 so as not to interfere with the flow of air through the passageway 54.

As the diaphragm 48 inflates, the velocity of the air flowing through the passageway 54 increases to a point wherein the velocity of the air is equal to or exceeds the velocity of sound across a plane perpendicular to the passageway 54. This condition, known as choked flow, operates as a most effective sound barrier through which undesirable sound waves generated by rotation of the fan 26 and interaction of the fan 26 and the stator vanes 41 are incapable of passing. The sound barrier provided by inflation of the diaphragm 48 is not frequency sensitive and will thus effectively halt undesirable sound over an extremely wide range of frequency.

As previously mentioned, inflation of the diaphragm 48 is selectively obtainable by activation of the valve 52. Thus, when sound suppression is needed the control valve 52 is opened allowing pressurized control fluid to inflate the diaphragm 48 to the position shown in FIG. 2. When sound suppression is not needed, however (as for example in high altitude cruise conditions), the diaphragm 48 is deflated by closing the valve 52 and by opening a suitable bleed valve (not shown). In its deflated position as illustrated in FIG. 3, the diaphragm 48 is contiguous with the inner wall 46 of the casing 34 so as not to interfere with the flow of air through the passageway 54. Thus, inlet duct losses are kept to a minimum.

While it may not be necessary to totally choke the flow at all times, in order to provide some sound suppression, if desired, the platform 38 may be made thicker near its free end in order to provide a more definite converging-diverging passageway 54 when the diaphragm 48 is inflated as shown in FIG. 2. This would assure that choked flow conditions would be obtainable whenever the engine noise levels so require.

Referring now to FIG. 4, an alternative embodiment of the sound suppressor is shown wherein an inflatable diaphragm 60 is positioned on the platform 38' instead of on the inner wall 46 of the outer casing 34. In this embodiment, the platform 38' would have to be hollow in at least one location in order to provide for piping to inflate the diaphragm 60. The piping 62 would be run through the stator vanes 41 and from there back to a suitable source of pressurized fluid (for example, compressor discharge air from the core engine 12). In this design, the inner wall 46' of the outer casing 34 could be formed with a projecting portion 64 in order to provide a more definite converging-diverging passageway 54' upon inflation of the diaphragm 60. Inflation of the diaphragm 60 would again provide choked flow within the passageway 54' and would thus act as a sound barrier for undesirable noise emanating from the fan 26.

From the above description it is readily apparent that applicant has provided a practical, simple, and lightweight sound suppressor for use with a high bypass ratio turbofan engine. Very few moving parts are needed to actuate the sound suppressor and losses are negligible when the sound suppressor is not needed. While a number of preferred embodiments of this invention have been shown and described, it will be obvious to those skilled in the art that there are certain changes and modifications which may be made in the above embodiments without departing from the invention in its broader aspects. The following appended claims are therefore intended to cover the invention in its broader aspects.

What is claimed is:

1. In a jet propulsion power plant of the fan type having a core engine and a fan driven by the core engine, sound suppression means comprising:

a cylindrical casing enclosing the fan of said power plant and spaced from said core engine to form therewith an axially extending bypass passageway for the flow of fluid between inlet and outlet openings at opposite ends of said casing, a plurality of stator vanes radially fixed within said passageway, said stator vanes having axially extending platforms positioned along their radial lengths to divide said passageway into an inner flow chamber and an outer flow chamber, a circumferential elastic diaphragm carried by said casing proximate said inlet opening, said diaphragm having a deflated position wherein it is contiguous with an inner wall of said casing and an inflated position wherein it extends into said outer flow chamber, and means for selectively inflating said elastic diaphragm whereby increased velocity flow conditions are attained within said outer flow chamber.

2. Sound suppression means as recited in claim 1 wherein said elastic diaphragm cooperates with said platforms to form a converging-diverging passageway within said outer flow chamber upon inflation of said diaphragm.

3. Sound suppression means as recited in claim 2 wherein inflation of said diaphragm causes choking of the flow within said outer flow chamber.

4. Sound suppression means as recited in claim 2 wherein said selective inflating means includes piping positioned within said casing and lying in fluidic flow cooperation with a source of pressurized fluid.

5. Sound suppression means as recited in claim 4 wherein said source of pressurized fluid is said core engine.

6. Sound suppression means as recited in claim 5 wherein said selective inflating means further includes a valve capable of pilot actuation.

7. In a jet propulsion power plant, sound suppression means comprising:
  a cylindrical casing surrounding an axially extending passageway for the flow of low temperature motive fluid between inlet and outlet openings at opposite ends of said casing,
  a fan positioned within said casing, said fan including a fan rotor and a plurality of stator vanes extending radially from said casing, said stator vanes including an axially extending platform,
  expansible means carried by said platform, said expansible means having an inflated position wherein said expansible means extends into said passageway,
  means for inflating and deflating said expansible means,
  said expansible means, when in the inflated position, causing choked flow to occur within said passageway adjacent said inlet opening.

8. Sound suppression means as recited in claim 7 wherein said expansible means comprises an elastic diaphragm supported by said platform in a fluidically sealed manner along front and rear ends of said diaphragm.

9. Sound suppression means as recited in claim 8 wherein said expansible means are contiguous with said platform when in a deflated position.

10. Sound suppression means as recited in claim 9 wherein said expansible means when in inflated position, provide a converging-diverging passageway proximate said inlet opening.

11. Sound suppression means as recited in claim 10 further including second expansible means carried by said casing, said second expansible means cooperating with the first of said expansible means to form a converging-diverging passageway when in an inflated position.

References Cited
UNITED STATES PATENTS

| 2,763,426 | 9/1956 | Erwin | 60—39.29 |
| 2,966,028 | 12/1960 | Johnson | 137—15.1 |
| 3,532,100 | 10/1970 | Ward | 137—15.1 |
| 3,532,129 | 10/1970 | Ward | 137—15.1 |

DOUGLAS HART, Primary Examiner

U.S. Cl. X.R.

60—39.29; 137—15.1; 181—33 HA; 415—119